United States Patent Office 2,783,270
Patented Feb. 26, 1957

2,783,270

POLYHYDRIC ALCOHOL ESTERS OF ACIDS FORMED BY OXIDATION OF HYDROCARBONS

Orville L. Polly and Orin D. Cunningham, Long Beach, Calif., assignors to Union Oil Company of California, Los Angeles, Calif., a corporation of California No Drawing. Application December 8, 1950, Serial No. 199,916

11 Claims. (Cl. 260—485)

This invention relates to plasticizers suitable for use in plasticizing synthetic resins. The invention relates also to synthetic resin compositions containing these plasticizers.

More particularly, the invention relates to polymeric esters of a mixture of acids produced by the controlled oxidation of paraffin wax and to resin compositions, particularly polyvinyl resin compositions, containing such esters.

Plasticizers are added to synthetic resins to impart resilience, pliability, low temperature flexibility and the like to such resins. It is important that the plasticizing agent is capable of imparting these characteristics without causing degradation of the resin during heat treatment. Moreover, the plasticizer must have relatively low volatility and must be stable so that the plasticizer itself can withstand heat treatment necessary during processing and be capable of retaining its desirable characteristics during the life of the article produced. It is desirable that the plasticizing agent be water-insoluble, have a pleasant odor or no odor and that it be non-toxic. Also it is desirable in many applications that the plasticizer be colorless or at least light-colored. In many instances in order to obtain all of the characteristics desired in the plasticized product it is necessary to employ two or more plasticizers. Thus one may impart the desired characteristics of mechanical strength, stability, permanence and the like but fail to impart low temperature flexibility. In such case a second plasticizer is necessary to impart such other desirable characteristics to the extent required in the finished product.

It is known that polymeric esters obtained by esterifying a dibasic acid with a glycol serve as plasticizers but in general these esters are extremely viscous, syrupy liquids which are difficult to handle. Moreover, these products, when added to resins, produce compositions having poor low temperature flexibility. It is known also that polymeric esters produced using poly alcohols containing more than two hydroxyl groups, such as glycerol, pentaerythritol and the like, with dibasic acids are solid resins useless as plasticizers.

It has now been found that polymeric esters of mixtures of acids produced by the controlled oxidation of paraffin wax with glycols or with alcohols containing 3 or 4 hydroxyl groups are excellent polyvinyl resin plasticizers. These mixed esters are oily liquids of low viscosity and when compounded with resins they produce compositions having excellent low temperature flexibility, good mechanical strength, excellent stability and permanence. Moreover, by the selection of a particular ester or fraction of ester a plasticizer capable of imparting each of the desired characteristics to the desired degree is obtained. Thus the method of preparing the ester is also of importance and modifications in the method of preparation, in the selection of fractions of oxidized paraffin wax to be esterified, and in the treatment of the ester may be made to produce polymeric esters of the most desirable character for a given utilization.

It is therefore an object of this invention to produce polymeric ester plasticizers having the above characteristics from inexpensive raw materials.

Another object of this invention is to produce plasticized resin compositions having outstanding properties, which compositions contain the polymeric esters of this invention.

It is a further object of this invention to produce plasticizers having the described characteristics from paraffin wax by oxidizing the wax until the acid number of the wax is between 200 and 350 mg. KOH/g., esterifying the oxidized wax or a fraction thereof with a polyhydroxy alcohol having 2 to 4 hydroxyl groups per molecule and to produce plasticized resin compositions containing these esters.

A specific object of this invention is to produce plasticized polyvinyl resin compositions consisting of polyvinyl resins and esters of poly alcohols containing 2 to 4 hydroxyl groups per molecule with mixtures of acids produced by the oxidation of paraffin wax.

The invention resides therefore in plasticized synthetic resins comprising synthetic resins and plasticizing proportions of a mixture of polymeric esters of acids obtained from oxidized paraffin wax. The invention resides also in the esters themselves and in the method of preparing the esters. More specifically, the invention resides in plasticized polyvinyl resins comprising polyvinyl resin and plasticizing proportions of a mixture of esters obtained from oxidized paraffin wax or a fraction thereof and a polyhydroxy alcohol having 2 to 6 hydroxy groups per molecule and preferably 2 to 4 hydroxyl groups per molecule.

The acids present in the oxidized paraffin wax consist of a mixture of monocarboxylic and dicarboxylic acids, some of which acids contain hydroxyl and/or carbonyl groups. Therefore the invention resides also in esters produced by esterifying a mixture of mono- and dicarboxylic acids, at least some of which contain non-carboxyl oxygen in the form of hydroxyl and/or carbonyl groups with a polyhydroxy alcohol.

In preparing the plasticizers of this invention a paraffin wax such as a refined or deoiled paraffin wax having a melting point between about 43° C. and about 95° C., and preferably between about 55° C. and about 80° C., is heated to a temperature between about 100° C. and about 140° C. at a pressure between normal atmospheric pressure and about 20 atmospheres pressure and blown with air or other gas containing free oxygen until the acid number of the product is between about 200 and about 350 mg. KOH/g. This oxidation takes place readily without the use of catalysts. The resulting crude oxidized wax may be employed directly for preparing the esters of this invention.

The crude oxidized wax is esterified with a polyhydroxy alcohol and the resulting mixture of esters may be used without further treatment or it may be decolorized and/or clarified by treatment with an adsorbent or filtered through a bed or adsorbent. In the preferred method of preparing the esters the crude oxidized wax is esterified with a low molecular weight aliphatic alcohol such as methanol and this ester converted to the desired ester by an ester exchange reaction. Preferably the methyl ester will be fractionated either by hydrocarbon solvent extraction or by fractional distillation and one or more of the fractions so obtained subjected to the ester exchange reaction. Methods of esterification are discussed more completely hereinbelow.

The acids present in the crude oxidized wax are believed to consist of numerous straight and branched chain aliphatic monocarboxylic and dicarboxylic acids, at least some of which contain non-carboxyl oxygen present in hydroxyl groups, carbonyl groups and the like. Also, inter-reaction products between the various oxidized molecules are also present. Such products include esters, lactones and the like. The molecular weights of the non-inter-reacted acids range from that equivalent to about 5 or 6 carbon atoms to as high as 30 or 35 carbon atoms. Thus the esters produced by esterifying the wax oxidation product or fraction thereof consists of a complex mixture of esters of mono- and dicarboxylic acids, some of which contain carbonyl and hydroxyl groupings in the carbon chains of the acid portion of the ester. The presence of such carbonyl and/or hydroxyl groups, which imparts a high degree of polarity to the resulting esters, results in improved physical characteristics of the esters and in increased plasticizing efficiency.

The crude oxidized wax product is further characterized by a saponification number of about 300 to about 550 and a total oxygen to carboxyl oxygen ratio of between about 1.1 and about 1.6 to 1.

The method employed for determining hydroxyl groups is the one described by Fuchs et al. in Industrial and Engineering Chemistry, Analytical Edition, volume 12, page 507 (1940) and the method employed for determining carbonyl groups is the one described by Bryant et al., Journal of the American Chemical Society, volume 57, page 57 (1935).

Although the total oxidation product may be esterified to produce desirable plasticizing agents as indicated above, fractions of this oxidation product have been successfully employed and the resulting esters have the desirable plasticizing effects when incorporated in resin compositions. Thus the oxidized wax may be washed with water to remove water-soluble constituents and the water-insoluble fraction is found to produce esters having the desirable characteristics. Moreover, this water-insoluble fraction may be further fractionated by extraction with a light petroleum naphtha or thinner or with a hydrocarbon such as pentane, hexane, or heptane or a hydrocarbon fraction containing one or more of these hydrocarbons. This extraction results in the separation of oxidized wax into a naphtha-soluble fraction and a naphtha-insoluble fraction, each of which has been successfully used in preparing polymeric esters having good plasticizing characteristics. Generally, however, of these two fractions the naphtha-insoluble fraction is preferred. The acids present in this fraction have a higher content of non-carboxylic oxygen, i. e., oxygen present in hydroxyl and/or carbonyl groupings.

The naphtha-insoluble fraction will have an acid number between about 140 and about 200 mg. KOH/g. and a saponification number between about 225 and about 375 mg. KOH/g., depending upon the extent of oxidation of the wax. The saponification number-acid number ratio is usually between about 1.6 and 2.2 to 1. Moreover, the ratio of total oxygen to carboxyl oxygen, i. e. oxygen contained in the —COOH groupings or —COOR groupings, will be between about 1.4 and 1.6 to 1 although this ratio may vary, depending upon the conditions and extent of oxidation, between 1.2 and 1.8 to 1.

The naphtha-soluble fraction will generally have an acid number between about 130 and 190 mg. KOH/g. and a saponification number of about 200 to 350 mg. KOH/g. The ratio of total oxygen to carboxyl oxygen is somewhat lower than that of the naphtha-insoluble fraction and will be in the range of about 1.1 and 1.5 to 1.

Thus the oxidized wax or fraction thereof which is esterified to produce the plasticizers of this invention will have an acid number between about 130 and 350 mg. KOH/g. but this material will be obtained from an oxidized paraffin wax having an acid number in the range of 200 to 350 mg. KOH/g. since it is an oxidized product having an acid number within the range indicated that contains the optimum relative proportions of carboxylic acids free from hydroxyl, carbonyl and like non-acid substituents and those containing such substituents.

It is to be recognized that the average acid number of the acids present in the wax oxidation product is somewhat higher than that indicated above because the oxidized product is known to contain non-acid molecules, i. e., molecules containing only one or more hydroxyl and/or carbonyl groups. However, for convenience the desired oxidation product is defined on the basis of the crude mixture as produced since the crude mixture without purification is found to produce esters having the desired characteristics.

The oxidized paraffin wax or fraction thereof is converted into the desired ester by any of various methods of esterification which have been employed and found to give relatively high yields of esters which are active plasticizers. As indicated hereinabove, the polymeric esters can be prepared by direct esterification of wax oxidate or a selected fraction of wax oxidate, or they may be prepared by ester exchange wherein a low molecular weight alkyl ester of oxidized wax or a desired fraction thereof is reacted with a polyhydroxy compound. The latter method of preparation is the preferred method. Ester exchange catalysts may be employed to aid in this reaction, such as the alkali metal hydroxides, carbonates or alcoholates; alkaline earth metal oxides, hydroxides, carbonates, naphthenates or alcoholates; lead or tin oxides or soaps or the like. Magnesium methylate has been employed as the ester exchange catalyst with excellent results.

In preparing the methyl ester from which the polymeric esters may be subsequently produced, a mixture of crude oxidized paraffin wax having the acid number within the range of 200 to 350 mg. KOH/g., or one of the fractions of oxidized wax described above, is first saponified by treatment with an excess of caustic soda. This saponification may be effected in the presence of alcohol such as methanol or the like in order to increase the rate of saponification. The mixture is heated to boiling for approximately one hour and then extracted with petroleum naphtha to remove unsaponified material. The resulting soap solution is mixed with an excess of methanol and concentrated sulfuric acid is added slowly, maintaining the temperature at approximately room temperature until sufficient acid has been added to neutralize all of the soaps originally present. This treatment results in the conversion of the soaps directly into methyl esters. Following this treatment the esters may be water washed and washed with a dilute alkali, as for example an aqeuous sodium bicarbonate solution, and finally with water to eliminate mineral acid. The excess alcohol may then be removed by evaporation. A methyl ester prepared in this manner may be employed directly in the preparation of the polymeric esters of this invention or such methyl ester may be fractionated as by extraction with a light petroleum naphtha, or preferably with a low boiling hydrocarbon such as propane, butane, pentane, or the like, to obtain a fraction soluble in the hydrocarbon. This treatment rejects dark-colored and high boiling waxy esters. Following such fractionation the hydrocarbon-soluble fraction is the one to be used in the preparation of the polymeric esters.

Another method of fractionating the methyl esters is to fractionally distill the crude mixture of esters, those boiling above about 260° C. at 5 mm. Hg pressure being eliminated and the distillate boiling below about 260° C. at this pressure being used in the subsequent ester exchange reaction. Also, it is sometimes desirable to eliminate the lower boiling esters, as for example those boiling below about 90° C. at 5 mm. Hg pressure, but this is not generally necessary. Excellent plasticizers have been obtained using a fraction of methyl esters boiling between 75° C. and 160° C. at 5 mm. Hg pressure, for example.

The amount of polyhydroxy alcohol to be employed in the ester exchange reaction will be at least the theoretical amount necessary for complete conversion of the methyl ester and may be as much as 1.5 times the theoretical amount. Thus the ratio of equivalents of poly alcohol to equivalents of alkyl ester will be between 1 and 1.5 to 1. Generally this ratio will not exceed 1.2 to 1 and particularly with the glycols the ratio will preferably be about 1 to 1.

Other methods of preparing the polymeric esters include the direct esterification of oxidized wax or one of the fractions noted above with the desired polyhydroxy compound. Where direct esterification is employed the oxidized wax or fraction thereof is heated in the presence of an excess of polyhydroxy compound with or without the use of catalytic agent or dehydrating agent until evolution of water ceases. Suitable catalysts are concentrated sulfuric acid, hydrogen chloride and the like. The resulting esters may be purified by treatment with an adsorbent such as clay, activated charcoal, silica gel or the like. Such treatment improves the color and eliminates highly polymerized ester materials.

Polyhydroxy alcohols which have particular utility in preparing the polymeric esters of this invention include the dihydroxy alcohols, i. e. the glycols; the trihydroxy alcohols, as for example glycerol, trimethylol; ethane trimethylol; propane trimethylol; butane trimethylol; pentane trimethylol and similar alcohols; and the tetrahydroxy alcohols, such as for example pentaerythritol. Glycols which are particularly suitable include ethylene glycol, diethylene glycol, triethylene glycol, thiodiethylene glycol, propylene glycol, dipropylene glycol, trimethylene glycol; the butylene glycols, as for example the butanediols-1,3; the pentanediols, particularly the -2,4 diol; hexanediol-2,5, 2-ethylhexanediol-1,3, 2-ethylpentanediol-2,4, and 2-methoxymethyl-2,4-dimethylpentanediol-1,5 and the corresponding ethoxy derivative. Higher molecular weight dihydroxy compounds up to and including octadecanediol-1,12, for example, have been employed in the preparation of the polymeric esters of this invention and the resulting esters have the desired characteristics. In some cases dipentaerythritol, mannitol, sorbitol and the like may be employed but these alcohols are not to be considered equivalent to alcohols of the types mentioned hereabove.

Thus the esters of this invention are produced using poly alcohols, preferably those having 2 to 4 hydroxyl groups per molecule and containing about 2 to about 18 carbon atoms per molecule. The alcohols containing a larger number of hydroxyl groups can be used in some instances; however, they tend to produce resinous products which are not satisfactory as plasticizers in all cases. With the lower molecular weight fractions of acids some of the alcohols containing 5 or 6 or more hydroxyl groups have been found to produce liquid products. Also it is to be pointed out that as the molecular weight of the alcohol increases, the characteristics of the resulting polymeric esters appear to be modified in some respects. However, as indicated above poly alcohols containing up to 18 carbon atoms have been used with success. All of the above alcohols may be converted into suitable polymeric esters by the methods described hereinabove.

The esters of this invention are compatible with and may be used in combination with various natural and synthetic resins to produce plasticized or modified resins having the desired characteristics. However, it should be pointed out that some resins are not compatible with these esters. The preferred resins to be used and those in which the plasticizing effect is the greatest are the polyvinyl chloride, polyvinyl acetate, polyvinyl alcohol, polyvinyl butyral and polyvinyl formal resins and the various copolymers of these vinyl compounds. In this class of resins, which will be referred to herein as the polyvinyl resins, the modifications produced by incorporation of the esters of this invention are particularly desirable. With this group of compounds the esters are entirely compatible, do not have a tendency to migrate during ageing, the mixture is stable during heat processing and does not degenerate during outdoor exposure. The resulting products are resistant to water extraction and resistant to oil. They are generally of high tensile strength, have exceptional low temperature flexibility and they are light-colored when employing poly esters made from distilled methyl esters or hydrocarbon fractionated methyl esters or when employing hydrocarbon fractionated poly esters.

The amounts of plasticizer to be used may be varied over a relatively wide range. Generally between about 5% and 75% by weight of plasticizer, based on the polyvinyl resin, will be employed. However, it is observed that as little as 2% produces a definite plasticizing effect and as much as 100% has been employed in some instances without adversely affecting the character and mechanical strength of the resultant product. Because such high proportions of plasticizing agent may be employed and because secondary plasticizing agents are not necessary, the esters of this invention may be considered not only as primary plasticizing agents but also as secondary plasticizers and even as extenders. Moreover, because of the relatively low cost of these esters, their use in large proportions is commercially feasible.

The plasticizers of this invention may be incorporated into the resin compositions by conventional processes. Depending upon the application, i. e. the type of product to be produced, the plasticizer may be incorporated in the resin composition by a milling operation or by dissolving or dispersing the resin and plasticizer in a solvent or the relatively new plastisol technique may be employed. In the latter case a mixture of powdered resin and plasticizer is fused in the desired form at elevated temperatures.

When incorporating the plasticizers into polyvinyls, for example, a mixture of the polyvinyl resin and plasticizer is preferably milled on a 2-roll mill with the rolls heated to a temperature in the range of 130° C. to 140° C. The product may be sheeted off at these temperatures or may be cooled on the rolls before it is sheeted off, depending upon the composition. The resulting plasticized resin may be molded in the usual manner. During the milling other ingredients, such as stabilizers, fillers and the like, may be added as is well known in the art.

In preparing films or coatings with polyvinyl resins the resins and the plasticizers of this invention may be dissolved in a solvent such as a ketone, alcohol, ester or the like and the resulting solution spread on the surface to be coated. Upon evaporation of the solvent and/or heat treatment a permanent coating is obtained. Another method of application consists in preparing a paste using a finely divided vinyl resin and plasticizer and spreading this paste by spraying, dipping, knifing or roll coating on the surface to be coated. In this case the plasticized film is obtained by heating the product coated with the paste to a temperature of about 150° C. to 200° C. in order to fuse the coating and produce a continuous film. This method of application is particularly suitable when preparing coated fabrics, papers and the like.

The harder resins may be simply mixed and stirred with plasticizer at elevated temperatures until a uniform mass is obtained. On cooling and powdering, the resulting products are useful as molding compositions.

The following specific examples will serve to illustrate various aspects of this invention; however, it is to be understood that the various combinations of polymeric esters and resins described are illustrative and not to be taken as limiting since other combinations of esters and resins may be employed to give products of similar characteristics.

EXAMPLE I

*Preparation of oxidized paraffin wax*

Oxidized paraffin wax suitable for use in the preparation of esters to be used as resin and elastomer plasticizing agents have been prepared by the following process. About 8600 parts by weight of a refined petroleum wax having a melting point of 63° C. were introduced into an oxidation vessel provided with heating and cooling coils and with means for introducing and dispersing air at a point near the bottom of the vessel. The wax was heated to about 130° C. at a pressure of 100 p. s. i. gage. Air was introduced into the oxidation vessel at a rate of 5.5 cu. ft./barrel/minute. After about 20 hours the oxidation reaction had begun to progress satisfactorily and the temperature was decreased to about 125° C. and the temperature was maintained at this point during the remainder of the reaction. Air blowing was continued until the acid number of the wax being oxidized was approximately 280 mg. KOH/g. The product was removed from the oxidation vessel and found to have a saponification number of 490, an acid number of 280 and a saponification number-acid number ratio of 1.75. This product, which amounted to 9000 parts by weight, will be referred to herein as product "A."

A small proportion of product A was reserved for use in subsequent experimental work and the major portion, about 8500 parts, was washed with two 10-volume portions of water at about 100° C. After settling and removal of the aqueous phase there remained 5800 parts by weight of the water-insoluble fraction of wax oxidate. This product, which will be referred to as product "B," had an acid number of 170, a saponification number of 315 and a saponification number-acid number ratio of 1.85.

About 6000 parts by weight of product B was extracted with two 3-volume portions of a light petroleum naphtha having a boiling range of 50° C. to 85° C. The resulting naphtha-insoluble fraction amounted to 3960 parts by weight, corresponding to a yield of 66% based on product B. This naptha-insoluble fraction, which will be referred to as product "C," had an acid number of 180, a saponification number of 330. Analysis of this product indicated a total oxygen to carboxyl oxygen ratio of about 1.5.

The petroleum naphtha extract was heated to 120° C. to evaporate the naphtha. The resulting naphtha-soluble fraction of oxidized paraffin wax had an acid number of 160 and a saponification number of 300 mg. KOH/g. This product will be referred to herein as product "D."

EXAMPLE II

*Preparation of methyl esters of crude oxidized paraffin wax*

To a mixture of 10 gallons of crude oxidized paraffin wax prepared in a manner similar to that described in Example I and having a saponification number of 342 mg. KOH/g. and an acid number of 210 mg. KOH/g., and 2 gallons of water in the stainless steel steam jacketed kettle was slowly added with stirring 3.6 gallons of 50° Baumé caustic soda. The temperature was maintained at approximately 80° C. After the addition was complete the resulting solution was heated to boiling for one hour and allowed to stand overnight. It was then extracted 3 times with 30-gallon portions of a light petroleum naphtha to remove unsaponified material. This extraction was effected at temperatures between 50° C. and 60° C. The extraction was effected at temperatures between 50° C. and 60° C. The extracted soap solution was cooled and dissolved in 75 gallons of methanol and to this solution was added 6850 ml. of 96% sulfuric acid at a rate such that the temperature did not rise over about 32° C. By this treatment the pH of the solution was reduced to 3. A large amount of sodium sulfate precipitated and esterification of acids liberated from the soaps took place rapidly at room temperature. The rate of esterification was followed by acid number determinations on the reaction mixture and the reaction was continued until the acid number became substantially constant. This required about 72 hours. Following completion of the esterification, 19 pounds of sodium bicarbonate was added and the neutral solution evaporated to a volume of approximately 15 gallons. This product was dissolved in 30 gallons of water and the esters extracted at 55° C. with 2 successive 15-gallon portions of a petroleum thinner having a boiling range of about 70° C. to 110° C. The solvent was evaporated from the extract by heating to a temperature of approximately 120° C. to yield 3 gallons of esters in the form of a dark-brown, waxy slush. This material had an acid number of 23 and a saponification number of 241.

A 2000 gram portion of the above crude methyl ester was fractionated by vacuum distillation at a pressure of 5 mm. Hg into the following cuts:

| Cut No. | Temperature, ° C. | Weight, grams | Appearance |
|---|---|---|---|
| 1 | 90–120 | 256 | Colorless liquid. |
| 2 | 120–160 | 342 | Pale yellow liquid. |
| 3 | 160–210 | 388 | Light straw-colored liquid. |
| 4 | 210–225 | 137 | Waxy yellow slush. |
| 5 | 225–260 | 562 | Soft yellow wax. |
| Botts | | 222 | Black solid. |

The esters in these distillate fractions are suitable for use in preparing polymeric esters by ester exchange reactions and the polymeric esters so produced are extremely valuable plasticizing agents. It is to be noted that whereas the lower boiling materials, i. e. the fraction boiling between 90° C. and 120° C., would be too low boiling in and of itself to be employed in a plastic composition because of its volatility, when converted into polymeric esters with a polyhydroxy alcohol it is an exceptionally good plasticizing agent imparting extremely good low temperature flexibility to the resulting resins. When used alone, the fraction boiling from 225° C. to 260° C. at a pressure of 5 mm. Hg is not entirely satisfactory for the production of polymeric esters. This high boiling methyl ester results in the formation of waxy polymeric esters. However, when this fraction is combined with the lower boiling fractions or when the total distillate boiling between 90° C. and 260° C. at 5 mm. Hg pressure is employed the resulting mixture of esters is a satisfactory plasticizing agent having the desired miscibility and imparting the desired characteristics to resins.

EXAMPLE III

*Preparation of poly esters from crude oxidized paraffin wax*

A mixture of 115 g. of distilled methyl ester of oxidized paraffin wax (a mixture of cuts 1 and 2 from Example II), 31 g. of ethylene glycol and 6 ml. of magnesium methylate solution containing the equivalent of 2.5% magnesium metal was gradually heated in an atmosphere of nitrogen in distillation equipment. A distillate was collected and measured and the rate of heating was adjusted to control the distillation so that distillate was obtained at a relatively low rate. The mass was heated to 205° C. over a period of 3 hours and maintained between 200° C. and 250° C. for an additional 4 hours. At this time 24 ml. of distillate had been collected and distillate formation had substantially ceased. The nitrogen flow into the distillation flask was shut off and the pressure on the system slowly reduced using a vacuum pump. Heating was continued until the bottoms temperature reached 250° C. at a pressure of 2.2 mm. Hg. The resulting distillation bottoms was a medium-brown oil having slight turbidity. This product was filtered hot through a thin layer of diatomaceous earth and yielded 92 g. of product having the following characteristics:

| | |
|---|---|
| Molecular weight (ebullioscope) | 530 |
| Hydroxyl oxygen, percent by wt. | 1.2 |
| Carbonyl oxygen, percent by wt. | 1.6 |
| Acid number, mg. KOH/g. | 1.4 |
| Saponification number, mg. KOH/g. | 325 |
| Gardner color | [1] 13 |

[1] This color was determined by the method of Gardner as described in Physical and Chemical Examination of Paints, Varnishes, Lacquers and Colors by Gardner and Sward, eleventh edition, 1950, page 98.

The above experiment was repeated using the same fraction of methyl esters but with diethylene glycol, 2-ethylhexanediol-1,3,hexaethylene glycol, glycerol and pentaerythritol and gave products having similar physical and chemical characteristics.

EXAMPLE IV

*Preparation of poly esters from naphtha-soluble oxidized paraffin wax*

A portion of product D from Example I, i. e. naphtha-soluble paraffin wax oxidate, was dissolved in 5 volumes of naphtha, diluted with an equal volume of isopropanol and an amount of 50° Baumé caustic soda equivalent to the acid content of the fraction was added. The mixture was heated and agitated to effect neutralization. Sufficient water was then added to cause a phase separation with the soaps in the aqueous layer. The naphtha layer was discarded and the aqueous soap layer washed several times with naphtha to remove traces of neutral or unsaponifiable material. The acids were separated from the aqueous soap layer by acidification with sulfuric acid and the separated acids were water washed and dried. The product was a light-brown, waxy slurry.

A 16 kg. portion of the acids prepared above was dissolved in 140 liters of anhydrous methanol. To this solution was added 84 ml. of concentrated sulfuric acid and the solution allowed to stand with occasional stirring until the acid number had become substantially constant. The acid number was 48 mg. KOH/g. Sufficient sodium bicarbonate was added with vigorous stirring to neutralize the acid remaining in the product. The mixture was then filtered to remove solids and the solvent removed by means of a steam heated vacuum stripper. The product amounted to 14 kg. and was a dark-brown, waxy slush. This material was distilled at 1 mm. Hg pressure until solids began to form in the condenser tube. The distillate, which amounted to 8.5 kg., was refractionated by vacuum distillation at 5 mm. Hg pressure into the following cuts:

| Cut No. | Temperature, °C. | Weight, Grams | Appearance |
|---|---|---|---|
| 0 | 20–75 | 184 | Colorless (discard). |
| 1 | 75–185 | 4,840 | Light-yellow fluid. |
| 2 | 185–210 | 2,067 | Light-brown oil. |
| Botts | | 1,436 | Dark-brown waxy solid. |

Cut 1 was used in the preparation of polymeric esters according to the following procedure. A mixture of 75 g. of the methyl esters, 45 g. of glycerol and 0.08 g. of calcium oxide was heated in distillation equipment in an atmosphere of pure carbon dioxide at 200° C. until no more distillate was recovered. Heating was continued for an additional 14 hours. This additional heating period is found to increase the yield of polyesters but does not appear to affect any of the characteristics of the products, i. e. molecular weight is apparently not increased by additional heating. At the end of this time carbon dioxide flow into the distillation flask was discontinued and the pressure gradually reduced to 2.5 mm. Hg, where it was maintained until no more distillate was formed at 200° C. The product amounted to 73 g. This product has an average molecular weight of 495 and a Gardner color of 14.

This experiment was repeated using ethylene glycol and pentaerythritol. In each case the reaction proceeded in a manner very similar to that obtained with glycerol and the products were of comparable characteristics.

EXAMPLE V

*Applications of poly esters in calendered polyvinyl chloride acetate films*

A mixture of 24 g. of a copolymer of vinyl chloride (95%) and vinyl acetate (5%) having an intrinsic viscosity of 1.25 in cyclohexanone at 20° C. and 12 g. of plasticizer with 0.72 g. of dibasic lead phosphite as a stabilizer was pre-mixed in a beaker with a spatula. The pre-mixed material was transferred to a 2-roll mill, the rolls being 6 inches by 6 inches with the rolls turning at equal speeds and being heated to 130° C.–140° C. Milling was continued until the product was uniform, at which time it was sheeted off at about 0.01 inch thickness. The resulting films were evaluated empirically for flexibility at room temperature and at −18° C. and "sweat-out" at 35° C. In addition, the oil and water extraction losses were determined by the method described by Reed in Industrial and Engineering Chemistry, vol. 35, page 896 (1943). The results of tests on films prepared using as plasticizers various poly esters of this invention together with tests on corresponding compositions made with commercial polymeric and monomeric ester plasticizers are shown in the following table.

| Plasticizer | Flexibility at— | | Sweat-out | Extraction loss, percent | | Flexibility at 20° C. after water extraction |
|---|---|---|---|---|---|---|
| | 20° C. | −18° C. | | Water | Oil | |
| Ethylene glycol poly ester from Example III. | Fair | Fair | No | 1.2 | 8.2 | No change. |
| Glycerol poly esters from Example IV. | Good | do | Slight | 1 | 7 | Do. |
| Poly ester from Example I. | Fair | do | No | 1.2 | 8.2 | Do. |
| Poly ester from Example II. | Good | do | Slight | | | |
| Ethylene glycol sebacate. | Fair | Brittle | No | 0.0 | 10.8 | Slightly stiffer. |
| Dioctyl phthalate | Good | Fair | No | 3.2 | 3.7 | Do. |
| Dibutyl sebacate | do | Good | No | 2.7 | 20.8 | Much stiffer. |
| Tricresyl phosphate | Fair | Brittle | No | 8.0 | 0.0 | No change. |

It will be observed in the above table that the properties of the plasticizers of this invention are well balanced. For example, the low temperature flexibility is superior to that of the ethylene glycol sebacate and tricresyl phosphate, water extractibility is lower than that of the monomeric plasticizers while the oil extractibility is not excessive. Retention of flexibility after extraction is excellent.

Similar compositions were made with the addition of various pigments in varying amounts along with about 0.5% of lithium stearate as a lubricant. The results obtained were comparable with the above. Many handsome and decorative films of excellent smoothness, brilliant color, and outstanding toughness have been made by such modifications.

EXAMPLE VI

*Application of poly ester in cast polyvinyl acetate film*

Solutions of 5 grams of a 100% polyvinyl acetate of intrinsic viscosity of 0.56 in cyclohexanone at 20° C. and 0.25 g. of plasticizer were made in 25 ml. portions of acetone. An 0.0034 inch thick wet film of each solution was spread on a glass plate with a film applicator, the film air dried and then oven dried at 130° C. for one-half hour. Films made with this resin containing various plasticizers were compared empirically and the hardness measured with a Sward hardness rocker before and after exposure of the plates in a 130° C. oven for one week. This test is described in Physical and Chemical Examination of Paints, Varnishes, Lacquers and Colors by Gardner and Sward, eleventh edition, 1950, pages 164–166. The constancy of hardness and retention of flexibility under the conditions of test were regarded as evidence of permanence of the plasticizer.

| Plasticizer | Compati-bility | Sward Hardness * | | Flexibility | |
|---|---|---|---|---|---|
| | | Before | After | Before | After |
| Ethylene glycol poly ester from Example III. | Good | 20 | 22 | Good | Very good. |
| Glycerol poly ester from Example IV. | do | 18 | 20 | do | Do. |
| Ethylene glycol-sebacate-poly ester | do | 20 | 26 | do | Do. |
| Dioctyl phthalate | do | 18 | 22 | do | Poor. |
| Dibutyl sebacate | do | 6 | 34 | do | Do. |
| No plasticizer | | 34 | | Brittle | Brittle. |

* Scale runs from 0 for very soft films to 100 for glass alone.

It is seen that in resistance to high temperature, or evaporative loss, that the poly esters of our invention are superior to monomeric esters and slightly better than the commercially successful glycol sebacate poly ester.

EXAMPLE VII

*Applications of poly esters in polyvinyl plastisols*

A mixture of 30 g. of a copolymer of vinyl chloride (95%) and vinyl acetate (5%) having an intrinsic viscosity in cyclohexanone at 20° C. of 1.53, and 20 g. of the glycerol poly ester from Example IV together with 1 g. of cadmium stearate was mixed in a dough mixer until uniform. The resulting viscous pale ivory-colored paste was spread on glass plates in a film thickness of 0.02 inch with a film applicator. The glass plates were placed in an oven at 175° C. for about 5 minutes, at which time the paste had fused. The plates were removed and the films stripped from the glass plates. Films thus produced are clear pale yellow in color, extremely strong and tough and are suitable for the manufacture of upholstery, luggage and similar materials.

This experiment was repeated using the erythritol poly ester produced in Example IV. Films produced with this ester were similar in appearance and physical characteristics to those obtained with the glycerol ester.

The foregoing description and examples of our invention are not to be taken as limiting since many variations may be made by those skilled in the art without departing from the spirit or the scope of the following claims.

We claim:

1. A composition of matter suitable for use as a plasticizing agent for synthetic resins comprising a mixture of esters of a polyhydroxy alcohol having 2 to 6 hydroxyl groups and a water-insoluble fraction of oxidized paraffin wax having an acid number between about 130 and about 350 mg. KOH/g., said fraction being obtained from an oxidized paraffin wax obtained by oxidizing a refined paraffin wax having a melting point between about 43° C. and about 95° C. in the liquid phase with a gas containing free oxygen at a temperature between 100° C. and 140 C. until the acid number of the product is between about 200 and about 350 mg. KOH/g.

2. A composition of matter according to claim 1 wherein said alcohol is a glycol.

3. A composition of matter according to claim 1 wherein said alcohol is ethylene glycol.

4. A method of preparing a plasticizer for synthetic resins which comprises oxidizing paraffin wax in the liquid phase by blowing with a gas containing free oxygen at temperatures between about 100° C. and about 140° C. until the acid number of the product is between about 200 and about 350 mg. KOH/g., extracting the oxidized paraffin wax with water and with petroleum naphtha to produce a water-insoluble, naphtha-soluble fraction, esterfying acid water-insoluble, naphtha-soluble fraction with methanol and converting the resulting methyl ester into a polymeric ester by ester exchange with a polyhydroxy alcohol having 2 to 4 hydroxyl groups per molecule.

5. A method according to claim 4 wherein said polyhydroxy alcohol is a glycol.

6. A method according to claim 4 wherein said polyhydroxy alcohol is glycerol.

7. A method according to claim 4 wherein the ratio of equivalents of polyhydroxy alcohol to equivalents of methyl ester used in the ester exchange reaction is between 1 and 1.5 to 1.

8. A composition of matter suitable for use as a plasticizing agent for synthetic resins comprising a mixture of esters of a polyhydroxy alcohol having 2 to 6 hydroxyl groups and a water-insoluble, naphtha-soluble fraction of oxidized paraffin wax having an acid number between about 130 and about 190 mg. KOH/g., said fraction being obtained from an oxidized paraffin wax obtained by oxidizing a refined paraffin wax having a melting point between about 43° C. and about 95° C. in the liquid phase with a gas containing free oxygen at a temperature between 100° C. and 140° C. until the acid number of the product is between about 200 and about 350 mg. KOH/g.

9. A method of preparing a plasticizer for syntheic resins which comprises oxidizing paraffin wax in the liquid phase by blowing with a gas containing free oxygen at temperatures between about 100° C. and about 140° C. until the acid number of the product is between about 200 and about 350 mg. KOH/g., saponifying the oxidized paraffin wax with caustic soda, extracting the resulting saponified product with a petroleum naphtha to remove unsaponifiable material, esterifying the extracted product by dissolving said extracted product in methanol and adding concentrated sulfuric acid in a quantity sufficient to react with the soaps present in the extracted saponified product, and converting the resulting methyl esters into a polymeric ester by ester exchange with a polyhydric alcohol having 2 to 4 hydroxyl groups per molecule.

10. A method according to claim 9 in which said oxidized product having an acid number between about 200 and 350 mg. KOH%g., is extracted with water to remove water-soluble components prior to said sponification with caustic soda.

11. A method according to claim 9 in which said oxidized product having an acid number between about 200 and about 350 mg. KOH/g., is extracted with water and with naphtha to obtain a water-insoluble, naphtha-soluble fraction of said oxidized product, which water-insoluble, naphtha-soluble fraction is saponified with caustic soda.

References Cited in the file of this patent

UNITED STATES PATENTS

| | | |
|---|---|---|
| 1,970,578 | Schoeller et al. | Aug. 21, 1934 |
| 2,006,555 | Ezard | July 2, 1935 |
| 2,054,979 | Jahrstorfer et al. | Sept. 22, 1936 |
| 2,182,371 | Carver et al. | Dec. 5, 1939 |
| 2,409,548 | Debacher | Oct. 15, 1946 |
| 2,581,506 | Zellner | Jan. 8, 1952 |
| 2,581,507 | Zellner | Jan. 8, 1952 |
| 2,581,508 | Zellner | Jan. 8, 1952 |